United States Patent
Schibsbye

(10) Patent No.: US 9,567,981 B2
(45) Date of Patent: Feb. 14, 2017

(54) WIND TURBINE TOWER AND METHOD OF PRODUCTION THEREOF

(71) Applicant: SIEMENS AKTIENGESELLSCHAFT, München (DE)

(72) Inventor: Karsten Schibsbye, Fredericia (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/271,876

(22) Filed: May 7, 2014

(65) Prior Publication Data

US 2014/0237919 A1  Aug. 28, 2014

Related U.S. Application Data

(63) Continuation-in-part of application No. 13/629,920, filed on Sep. 28, 2012, now abandoned.

(30) Foreign Application Priority Data

Sep. 30, 2011  (EP) .................................... 11183465

(51) Int. Cl.
*E04H 12/34* (2006.01)
*F03D 11/04* (2006.01)
(Continued)

(52) U.S. Cl.
CPC ................ *F03D 11/04* (2013.01); *B28B 1/26* (2013.01); *E04C 5/07* (2013.01); *E04H 12/34* (2013.01); *F03D 13/20* (2016.05); *E04C 3/20* (2013.01); *E04C 3/30* (2013.01); *E04H 12/12* (2013.01); *F05B 2240/912* (2013.01); *F05B 2280/6003* (2013.01); *F05B 2280/6013* (2013.01); *F05B 2280/702* (2013.01); *Y02E 10/728* (2013.01); *Y02P 70/523* (2015.11)

(58) Field of Classification Search
CPC .............. E04H 12/34; E04C 3/34; E04C 5/07; E04C 3/20; E04C 3/30; E04C 3/44; B28B 1/26
USPC ................. 52/834, 847, 648.1, 649.1, 649.2, 649.3,52/FOR. 103, FOR. 104, FOR. 105, FOR. 106,52/FOR. 107; 416/DIG. 6
See application file for complete search history.

(56) References Cited

U.S. PATENT DOCUMENTS 3,429,758 A * 2/1969 Young .............................. 156/79
4,049,022 A * 9/1977 Farahar ......................... 138/176
(Continued)

FOREIGN PATENT DOCUMENTS

CH    691608 A5   8/2001
EP    2253782 A1  11/2010

OTHER PUBLICATIONS

Machine Translates WO9809042.*
(Continued)

*Primary Examiner* — Babajide Demuren

(57) ABSTRACT

A wind turbine tower is made of reinforced concrete with fiber rovings as reinforcements, wherein the fiber rovings are basalt fiber rovings. In one embodiment, the basalt fiber rovings may include, for example, a bundle of multiple parallel oriented basalt fibers forming a thin rope. In one embodiment, the tower is produced in a slip forming process or slip molding process, wherein the basalt fiber rovings are embedded in the concrete during the slip forming process.

12 Claims, 1 Drawing Sheet

(51) Int. Cl.
  *B28B 1/26* (2006.01)
  *E04C 5/07* (2006.01)
  *E04C 3/30* (2006.01)
  *E04C 3/20* (2006.01)
  *E04H 12/12* (2006.01)

(56) References Cited

U.S. PATENT DOCUMENTS

| | | | | |
|---|---|---|---|---|
| 4,283,446 | A | * | 8/1981 | McLain ........................ 428/36.3 |
| 4,314,798 | A | | 2/1982 | Pettersson |
| 4,514,245 | A | * | 4/1985 | Chabrier ........................ 156/161 |
| 4,786,341 | A | * | 11/1988 | Kobatake et al. .............. 156/71 |
| 5,025,605 | A | * | 6/1991 | Sekijima et al. ........... 52/309.16 |
| 5,043,033 | A | * | 8/1991 | Fyfe ................................. 156/71 |
| 5,133,510 | A | * | 7/1992 | Davis et al. ................ 242/438.1 |
| 5,194,110 | A | * | 3/1993 | Fawley ............................ 156/94 |
| 5,218,810 | A | * | 6/1993 | Isley, Jr. .......................... 52/834 |
| 5,633,057 | A | * | 5/1997 | Fawley ......................... 428/36.1 |
| 5,649,398 | A | * | 7/1997 | Isley et al. .................. 52/309.17 |
| 6,189,286 | B1 | * | 2/2001 | Seible et al. ..................... 52/834 |
| 7,963,747 | B2 | * | 6/2011 | Cairo ............................. 416/230 |
| 2002/0003004 | A1 | * | 1/2002 | Guckert ................... B29C 53/60 138/137 |
| 2004/0065044 | A1 | * | 4/2004 | Bleibler ................... B29C 53/14 52/649.1 |
| 2006/0070338 | A1 | * | 4/2006 | Pantelides et al. .......... 52/721.3 |
| 2008/0184654 | A1 | | 8/2008 | Polyzois et al. |
| 2008/0313972 | A1 | * | 12/2008 | Grob et al. ........................ 52/40 |
| 2009/0025304 | A1 | | 1/2009 | Clenen |
| 2009/0307998 | A1 | | 12/2009 | Kirkley |
| 2010/0281819 | A1 | * | 11/2010 | Thompson ................. 52/745.17 |
| 2010/0325986 | A1 | * | 12/2010 | Garc A Maestre et al. . 52/223.3 |
| 2011/0138704 | A1 | * | 6/2011 | Bagepalli et al. .............. 52/147 |
| 2014/0157715 | A1 | * | 6/2014 | Wagner ...................... 52/651.07 |

OTHER PUBLICATIONS

Marina Presley, Basalt Fiber Rebar, Mar. 3,2011, http://www.monolithic.org/stories/basalt-fiber-rebar.*

Khatri, Economics of Taller Wind Towers, http://www.revewableenergyworld.com/rea/news/article/2010/02/economics-of-taller-wind-towers [retrieved on Oct. 23, 2014], URS Corp., Feb. 17, 2010.

* cited by examiner

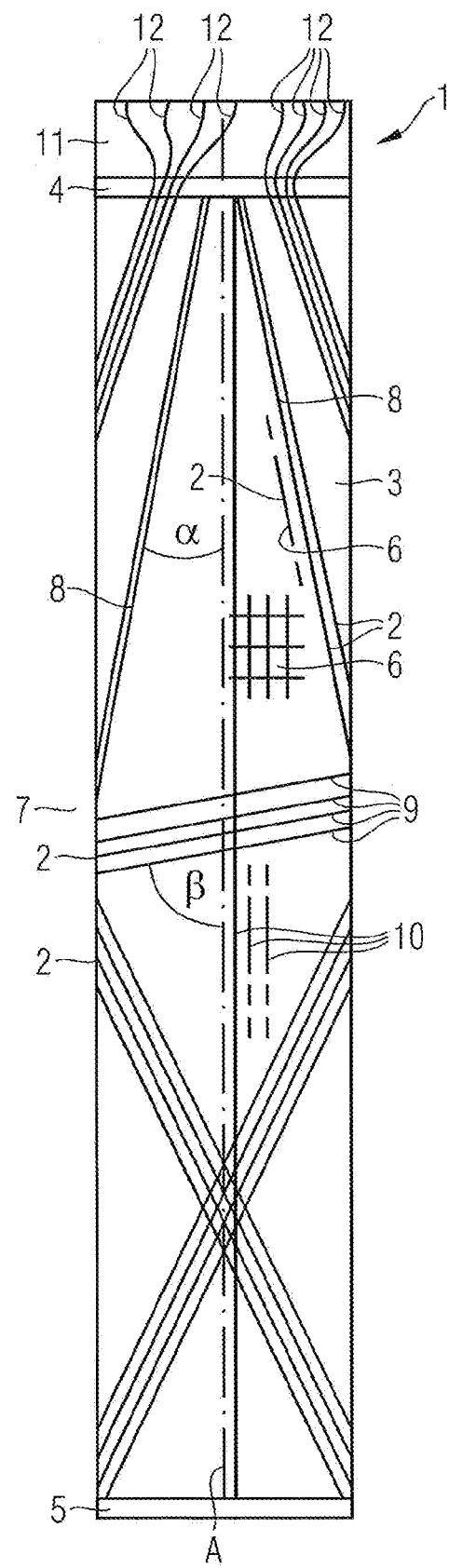

WIND TURBINE TOWER AND METHOD OF PRODUCTION THEREOF

CROSS REFERENCE TO RELATED APPLICATIONS

This application is a continuation-in-part of U.S. application Ser. No. 13/629,920 filed on Sep. 28, 2012. The U.S. application Ser. No. 13/629,920 claims priority of European Patent Office application No. 11183465.1 filed Sep. 30, 2011. All of the applications are incorporated by reference herein in their entirety.

FIELD OF INVENTION

The illustrated embodiments relate to a wind turbine tower and a method of production of a wind turbine tower.

BACKGROUND OF INVENTION

Wind turbine towers, especially tubular steel towers for large wind turbines, are large in diameter and weight. This may cause difficulties concerning the transportation of a tower to the wind farm and the used infrastructure.

Slip forming for construction is a method of continuously pouring concrete into a form of mould that moves up vertically, normally with the assistance of hydraulic or screw jacks. As the forming of the structure progress, the section of previously poured concrete hardens and forms a kind of support wall that is strong enough to withstand the concrete poured over the top of it. Pouring continues until the desired height of the structure is reached, allowing for a type of concrete structure that is positioned on top of a foundation and completely hollow inside. U.S. Pat. No. 4,314,798 illustrate such a slip forming system.

The slip forming process is known in the art as being used to build wind turbine towers.

The casted concrete structure may comprise solid iron or stainless steel bars or grids for reinforcement.

It is also known to use fibers as reinforcement of concrete in wind turbine towers. US2009/0307998 is one such example. The Fibre Reinforced Concrete (FRC) is a technology which can be used together with different types of fibers such as plastics, metal, glass etc. Normally chopped fibers are mixed with the concrete to enhance the tensile properties.

SUMMARY OF INVENTION

It is desirable to provide a wind turbine tower with prolonged lifetime and reduced costs.

This objective is solved by the features of the independent claim(s).

The depending claims define further embodiments.

The technical problem which is solved by the illustrated embodiments may be regarded as the provision of an improved concrete wind turbine tower with lower weight and same strength as known concrete wind turbine towers.

The embodiments relate to a reinforced concrete wind turbine tower comprising fibre rovings as reinforcement and wherein the fibre rovings are basalt fibre rovings.

Basalt fibre is a fibre produced from Basalt rock. In exemplary embodiments, basalt fibre may be manufactured using only (or substantially) crushed basalt rock, with negligible or no added chemicals. Basalt fibers may be produced by methods similar to fiberglass production. However, basalt fibers exhibit significantly higher tensile strength than glass fibers. Basalt fibers also have higher heat resistance as compared to asbestos, without carcinogenic issues.

A basalt fibre roving is a bundle of multiple parallel oriented basalt fibers, its shape being similar to a thin rope.

In one embodiment, the basalt fibre diameter is in the range of 5 μm to 10 μm, and/or the number of basalt fibers in the roving is between 5000 and 30000, and/or the basalt fibre diameter is in the range between 10 μm and 30 μm, and/or the number of basalt fibers in the roving is between 500 and 2000, and/or the basalt fibre roving weight is between 0.20 and 30 kg/km.

In one embodiment, the basalt fibre rovings will be embedded in concrete during the slip forming process.

In one embodiment, the basalt fibre rovings are anchored in the concrete already at the bottom of the tower and it ends at the top of the tower.

In one embodiment, some of the basalt fibre rovings will be "winded" around the tower, e.g. in a ±25 deg. angle relative to the longitudinal (vertical) axis of the tower.

In one embodiment, some of the basalt fibre rovings will be embedded in e.g. 85 deg. angle relative to the longitudinal axis so that they basically follow the circumference of the tower.

In one embodiment, the basalt fibre rovings may also be placed in the concrete in a 0 deg. angle relative to the longitudinal axis of the tower.

At the top of the tower, where the tower has to adapt to either a yaw-construction or to some transition piece between the tower and the yaw-construction, the basalt fibre rovings may be placed in other paths in order to cope with the intensive tensions and stresses which act on this part of the tower.

In one embodiment, the basalt rovings or basalt fibre rovings are "pre-tensioned" when placed in the concrete during the slip moulding process in order not to create any wrinkles on the rovings or in order to strengthen the tower.

In one embodiment, the basalt fibre rovings can be embedded as a supplement to conventional iron bar reinforcement or the conventional iron bar reinforcement can be embedded as a supplement to basalt fibre rovings.

By providing that basalt fibre rovings are lighter than the corresponding iron bars, the whole tower construction will resultantly become lighter than conventional.

By providing that basalt fibre rovings do not corrode, the properties of the tower will be maintained during the lifetime. Furthermore the lifetime is prolonged.

The basalt fibers have higher tensile strength than steel or iron and are even cheaper.

An even further feature is that basalt fibre rovings are flexible and can be delivered on drums in desired lengths and they are thereby very easy to handle—especially compared to conventional reinforcement steel rods which are solid, un-flexible and difficult to handle.

Wind turbine towers with fibre reinforced concrete can achieve a height of 120 m and more.

BRIEF DESCRIPTION OF THE DRAWINGS

Further features, properties and advantages will become clear from the following description of embodiments in conjunction with the accompanying drawing, wherein:

FIG. 1: shows a schematic side view of a wind turbine tower with of the positions and directions in which the basalt fibre rovings will be positioned

DETAILED DESCRIPTION OF INVENTION

FIG. 1 shows a schematic side view of a wind turbine tower 1 made of reinforced concrete 3.

The reinforced concrete 3 of the a wind turbine tower 1 has fibre rovings 2,8,9,10 as reinforcements, wherein the fibre rovings are basalt fibre rovings.

A basalt fibre roving may be manufactured from volcanic basalt rock. In an exemplary process of manufacture, basalt rock is mined and crushed to gravel size. The crushed basalt is fed into a special furnace for melting. Molten basalt from the furnace is drawn from a bushing. The bushing may be made, for example from platinum. The bushing generally has multiple orifices or tips, for example 200-800 tips, wherein each orifice or tip produces one filament. The drawn out filaments are then cooled, for example, by a mist of water, and sized. Subsequently, the filaments are wound onto a winder as a unit. For example, the filaments are not twisted together, but form a flattened bundle. The wound filaments are then dried, for example, in an oven and subsequently reprocessed into rovings.

Basalt fibre has a tensile strength of about 4,840 Mpa and an elastic modulus of about 89 Gpa. Basalt fibers can be operated in a wide variety of temperatures, including a minimum application temperature of about −260 C (−435 F), a maximum application temperature of about 980 C (1800 F) and a maximum sustained application temperature of 850 C (1560 F).

The above described process of manufacture of basalt fibre rovings is exemplary. Basalt fibre rovings made via alternate manufacturing techniques may be also used in the production of the inventive wind turbine tower.

In FIG. 1, the basalt fibre rovings 2,8,9,10 are shown in different positions and directions in which the basalt fibre rovings 2,8,9,10 can be positioned. The different positions and directions of the basalt fibre rovings 2,8,9,10 are shown as example and can be combined deliberately to create different optimized embodiments of the wind turbine tower 1. Alternatively, only one position and/or direction of the shown basalt fibre rovings 2,8,9,10 can be chosen for the whole wind turbine tower 1.

The basalt fibre rovings 2,8,9,10 may be embodied as a bundle of multiple parallel oriented basalt fibers, with around 200 basalt fibers, forming a thin rope.

The tower 1 is produced in a slip forming process or slip moulding process. Slip forming for construction is a method of continuously pouring concrete into a form of mould that moves up vertically, normally with the assistance of hydraulic or screw jacks. As the forming of the tower structure progress, the section of previously poured concrete hardens and forms a kind of support wall that is strong enough to withstand the concrete poured over the top of it. Pouring continues until the desired height of the structure is reached, allowing for a type of concrete structure that is positioned on top of a foundation and completely hollow inside. The basalt fibre rovings 2,8,9,10 will be embedded in the concrete 3 during the slip forming process.

The basalt fibre rovings 2,8,9,10 can be anchored in the concrete 3 at the bottom 5 and at the top 4 of the wind turbine tower 1.

Some basalt fibre rovings 2,8,9,10 are winded around the wind turbine tower 1 in a given angle α, β relative to the longitudinal (vertical) axis A of the wind turbine tower 1

Some basalt fibre rovings 8 are in an angle of α=±25 degrees.

Some basalt fibre rovings are in an angle of β=±85 degree so that they basically follow the circumference of the tower wind turbine tower 1.

Some basalt fibre rovings 10 are placed in the concrete 3 in a zero degree angle relative to the longitudinal axis A of the tower 1, optionally under pretension.

At the top 4 of the wind turbine tower 1, the tower 1 adapts to either a yaw-construction 11 or to some transition piece between the tower 1 and the yaw-construction 11.

The basalt fibre rovings 12 are placed in paths in order to cope with the intensive tensions and stresses which act on this part of the tower 1.

The basalt fibre rovings 2,8,9,10 are pre-tensioned when placed in the concrete 3 during the slip moulding process in order not to create any wrinkles on the basalt fibre rovings or in order to stabilise the tower 1.

The basalt fibre rovings 2,8,9,10 can be embedded as a supplement to conventional iron bar reinforcement 6 or the conventional iron bar reinforcement 6 can be embedded as a supplement to the basalt fibre rovings 2.

The invention claimed is:

1. A slip-formed wind turbine tower comprising,
a reinforced concrete hollow structure with fibre rovings as reinforcements,
wherein the fibre rovings are basalt fibre rovings, and
wherein the basalt fibre rovings are embedded in the concrete during the slip forming process,
wherein each of the basalt fibre rovings are embodied as a bundle of multiple parallel oriented basalt fibers, and
wherein at a top portion of the tower, the tower adapts to a yaw-construction, and the basalt fibre rovings are placed in paths that deviate from the parallel path orientation found in a portion of the tower below the top portion in order to cope with the intensive tensions and stresses which act on this part of the tower.

2. The wind turbine tower according to claim 1, wherein the basalt fibre diameter is in the range of 5 μm to 30 μm; and/or
the number of basalt fibers in the roving is between 500 and 2000 or is between 5000 and 30000; and/or
the basalt fibre roving weight is between 0.20 and 30 kg/km.

3. The wind turbine tower according to claim 1, wherein the basalt fibre rovings are anchored in the concrete already at the bottom of the wind turbine tower and it ends at the top of the wind turbine tower.

4. The wind turbine tower according to claim 1, wherein at least some of the basalt fibre rovings are wound around the wind turbine tower in a first angle relative to the longitudinal axis of the tower.

5. The wind turbine tower according to claim 4, wherein said first angle is an angle of ±25 degrees.

6. The wind turbine tower according to claim 1, wherein at least some of the basalt fibre rovings are wound around the wind turbine tower in a second angle relative to the longitudinal axis of the tower.

7. The wind turbine tower according to claim 6, wherein said second angle is ±85 degrees, so that the basalt fibre rovings generally follow the circumference of the tower.

8. The wind turbine tower according claim 1, wherein at least some of the basalt fibre rovings are placed in the concrete in a zero degree angle relative to the longitudinal axis of the tower.

9. The wind turbine tower according claim 1, wherein the basalt fibre rovings are pre-tensioned when placed in the concrete during a slip moulding process in order not to create any wrinkles on the basalt fibre rovings or to stabilise the tower.

10. The wind turbine tower according to claim 1, wherein the basalt fibre rovings are configured to be embedded as a supplement to conventional iron bar reinforcement, or the conventional iron bar reinforcement is configured to be embedded as a supplement to the basalt fibre rovings.

11. The wind turbine tower according to claim 1, wherein as at least one basalt fibre roving approaches a top of the tower the roving deviates circumferentially from an angle with respect to a vertical axis of the tower that the roving maintains in a remainder of the tower.

12. The wind turbine tower according to claim 1, wherein the reinforced concrete is adapted to reach a height of 120 meters based on a configuration of the basalt fibre rovings.

* * * * *